US005774135A

United States Patent [19]
Letham

[11] Patent Number: 5,774,135
[45] Date of Patent: Jun. 30, 1998

[54] NON-CONTIGUOUS MEMORY LOCATION ADDRESSING SCHEME

[75] Inventor: Lawrence Letham, Chandler, Ariz.

[73] Assignee: VLSI, Technology, Inc., San Jose, Calif.

[21] Appl. No.: 743,992

[22] Filed: Nov. 5, 1996

[51] Int. Cl.$^6$ ........................................................ G06F 12/06
[52] U.S. Cl. ............................ 345/516; 711/217; 711/173; 365/230.01; 365/230.03; 365/230.06
[58] Field of Search ..................................... 711/202, 217, 711/218, 100, 154, 173, 170; 345/501, 513, 515, 516; 365/189.01, 189.05, 230.01, 230.03, 230.06, 230.08

[56] References Cited

U.S. PATENT DOCUMENTS

| | | | |
|---|---|---|---|
| 4,511,964 | 4/1985 | Georg et al. | 711/202 |
| 4,642,789 | 2/1987 | Lavelle | 345/192 |
| 4,656,596 | 4/1987 | Thaden et al. | 345/28 |
| 4,656,597 | 4/1987 | Bond et al. | 345/518 |
| 4,672,538 | 6/1987 | Takane | 711/2 |
| 4,774,652 | 9/1988 | Dhuey et al. | 711/202 |
| 4,860,252 | 8/1989 | Sykora | 711/5 |
| 4,933,877 | 6/1990 | Hasebe | 345/188 |
| 4,942,541 | 7/1990 | Hoel et al. | 345/515 |
| 4,961,153 | 10/1990 | Fredrickson et al. | 345/422 |
| 5,095,422 | 3/1992 | Horigushi | 711/201 |
| 5,113,492 | 5/1992 | Ariki et al. | 707/520 |
| 5,119,331 | 6/1992 | Sussman | 365/189.01 |
| 5,134,699 | 7/1992 | Aria et al. | 395/855 |
| 5,146,571 | 9/1992 | Logan | 711/206 |
| 5,185,694 | 2/1993 | Edenfield et al. | 395/287 |
| 5,210,852 | 5/1993 | Sato | 711/112 |
| 5,235,551 | 8/1993 | Sinofsky et al. | 365/230.01 |
| 5,282,177 | 1/1994 | McLaury | 365/230.05 |
| 5,287,470 | 2/1994 | Simpson | 711/157 |
| 5,293,593 | 3/1994 | Hodge et al. | 711/202 |
| 5,309,568 | 5/1994 | Ghosh et al. | 395/309 |
| 5,319,606 | 6/1994 | Bowen et al. | 365/230.06 |
| 5,345,573 | 9/1994 | Bowden, III et al. | 711/217 |
| 5,377,344 | 12/1994 | Stager et al. | 711/154 |
| 5,404,445 | 4/1995 | Matsumoto | 345/520 |
| 5,426,739 | 6/1995 | Lin et al. | 395/309 |
| 5,487,146 | 1/1996 | Guttag et al. | 345/516 |
| 5,499,385 | 3/1996 | Farmwald et al. | 711/100 |
| 5,517,609 | 5/1996 | Guillemaud et al. | 345/507 |
| 5,550,961 | 8/1996 | Chimoto | 345/433 |
| 5,555,425 | 9/1996 | Zeller et al. | 395/290 |

*Primary Examiner*—Kee M. Tung
*Attorney, Agent, or Firm*—Woodard, Emhardt, Naughton Moriarty & McNett

[57] ABSTRACT

A processing system and method is disclosed to access non-contiguous memory locations within a memory block. An address is generated that has a first group of bits and a second group of bits. The first group is decoded to select one of a number of memory blocks. The second group has n bits configured to select any one of $(2^n-(n+1))$ unique combinations of the locations within the selected block. This second group provides a different pattern corresponding to each different combination of the locations within the selected block. An application of this addressing scheme for video graphics processing is also disclosed.

19 Claims, 5 Drawing Sheets

5,774,135

NON-CONTIGUOUS MEMORY LOCATION ADDRESSING SCHEME

BACKGROUND OF THE INVENTION

The present invention relates to digital addressing of memory locations, and more particularly, but not exclusively, relates to addressing a group of non-contiguous memory locations within a designated memory block.

Various addressing schemes have been implemented to access digital information in selected memory locations. As used herein "access" refers to reading data from a memory location or writing data to a memory location. In one common arrangement, a digital processor is coupled to a random access memory by a parallel bus, and each location of the memory has a unique binary address. Access by the processor to each location within the memory is provided by transmitting each corresponding address over the bus. Although this absolute addressing scheme provides a great deal of flexibility, it often adversely impacts system efficiency because the bus must be excessively wide to accommodate the number of bits of both the address and accessed data in parallel or it must be comparatively slower to sequentially transmit portions of the address, accessed data, or both. Moreover, because each address must be decoded before a given memory location is accessed, this decoding time also impacts system speed even if separate address and data buses are provided in parallel.

One attempt to solve this problem has been to employ a memory paging scheme. In this approach, each location is accessed by with a unique base address and relative address combination. Together, the base and relative addresses typically constitute a unique absolute address for a given location. In practice, the base address is decoded to designate a page of contiguous memory locations, and the relative address designates a specific location within the page. When memory accesses tend to be consecutive, multiple accesses to the same page frequently occur. Because the relative address requires comparatively fewer bits than an absolute addressing approach, these multiple accesses tend to improve efficiency. Nonetheless, paging still requires that a separate address be decoded for each memory access—often increasing the bus traffic or "overhead" associated with memory operations.

One way to reduce this overhead has been to address a contiguous block of memory either with or without memory paging. With this technique, a single address or range of addresses is specified which designates a contiguous group of memory locations. Typically, data corresponding to each location within the block is consecutively transmitted in a "pipline" fashion after these locations have been determined by decoding the applicable address or range of addresses. This scheme potentially increases bus bandwidth by requiring only one addressing event to access all the data locations in the contiguous block. Contiguous block transfer schemes are sometimes used to transfer data between peripheral devices and system memory through a Direct Memory Access (DMA) process. Indeed, in some cases, block moves may be directed from one designated block in memory to another. U.S. Pat. Nos. 5,134,699 to Aria et al., 5,185,694 to Edenfield et al., and 5,287,470 to Simpson are cited as additional sources of background information concerning contiguous block addressing schemes.

Unfortunately, the efficiency of contiguous block transfers relies on the need to access contiguous groups of data. This efficiency degrades as the degree of contiguity decreases for a given block size. When access to a relatively large group of non-contiguous memory locations within a memory block or page is required, this problem becomes particularly acute. Frequently, this situation arises in connection with video graphics operations. In fact, as reflected by U.S. Pat. Nos. 5,119,331 to Sussman, 5,282,177 to McLaury, 5,319,606 to Bowen et al., 5,487,146 to Guttag et al., 5,517,609 to Guillemaud et al., and 5,550,961 to Chimoto; several complex schemes of video memory management have arisen. Unfortunately, these schemes often greatly increase memory management complexity without escaping reliance on contiguous memory block transfers. Thus, in order to optimize bus bandwidth in certain situations, a need remains for a system and method to address selected non-contiguous memory locations within a designated memory block. The present invention satisfies this need and provides other important advantages.

SUMMARY OF THE INVENTION

The invention relates to a system and method for accessing multiple non-contiguous memory locations. Various aspects of the invention are novel, non-obvious, and provide various advantages. While the actual nature of the invention covered herein can only be determined with reference to the claims appended hereto, certain features which are characteristic of the present invention disclosed herein can be described briefly.

One feature of the present invention is a method and system to address a combination of non-contiguous memory locations within a memory block. In one embodiment directed to this feature, an address having a first and second number of bits is transmitted to a digital device with memory that includes a number of independently accessible multi-bit storage registers. The first number of bits is decoded to select a contiguously addressable group of at least four of the registers, and the second number of bits is used to determine a non-contiguous combination of the registers in the group.

In another feature of the present invention, the second number of bits is further configured to selectively address any single location within the group or any possible contiguous combination of the registers.

Still another feature includes a processor for generating an address with a first number of bits and a second number of bits. The address is transmitted by the processor over a bus operatively coupled to a digital device. The device has a memory with a plurality of memory blocks and generates a block signal from the first number of bits to select one of the memory blocks. The selected block has a number of contiguously accessible multi-bit storage locations. The device also generates a plurality of location signals from the second number of bits which correspond to a non-contiguous set of the locations. The second number of bits provides a different pattern for each different non-contiguous grouping of the locations. A given location grouping is selected by providing the corresponding pattern of the second number of bits. The device accesses each of the locations in the set in accordance with the block signal and the location signals.

Accordingly, one object of the present invention is to provide an addressing scheme to access multiple non-contiguous memory locations.

Another object of the present invention is to improve bus bandwidth by addressing multiple non-contiguous memory locations within a memory block with a single address.

Still another object of the present invention is to improve performance of a video graphics processor by providing an encoded address designating multiple non-contiguous memory locations within a contiguous memory block and successively transmitting multi-bit data strings corresponding to each of the designated locations.

Further objects, features, and advantages will become apparent from the drawings and descriptions contained herein.

DESCRIPTION OF THE PREFERRED EMBODIMENT

Figure 1:
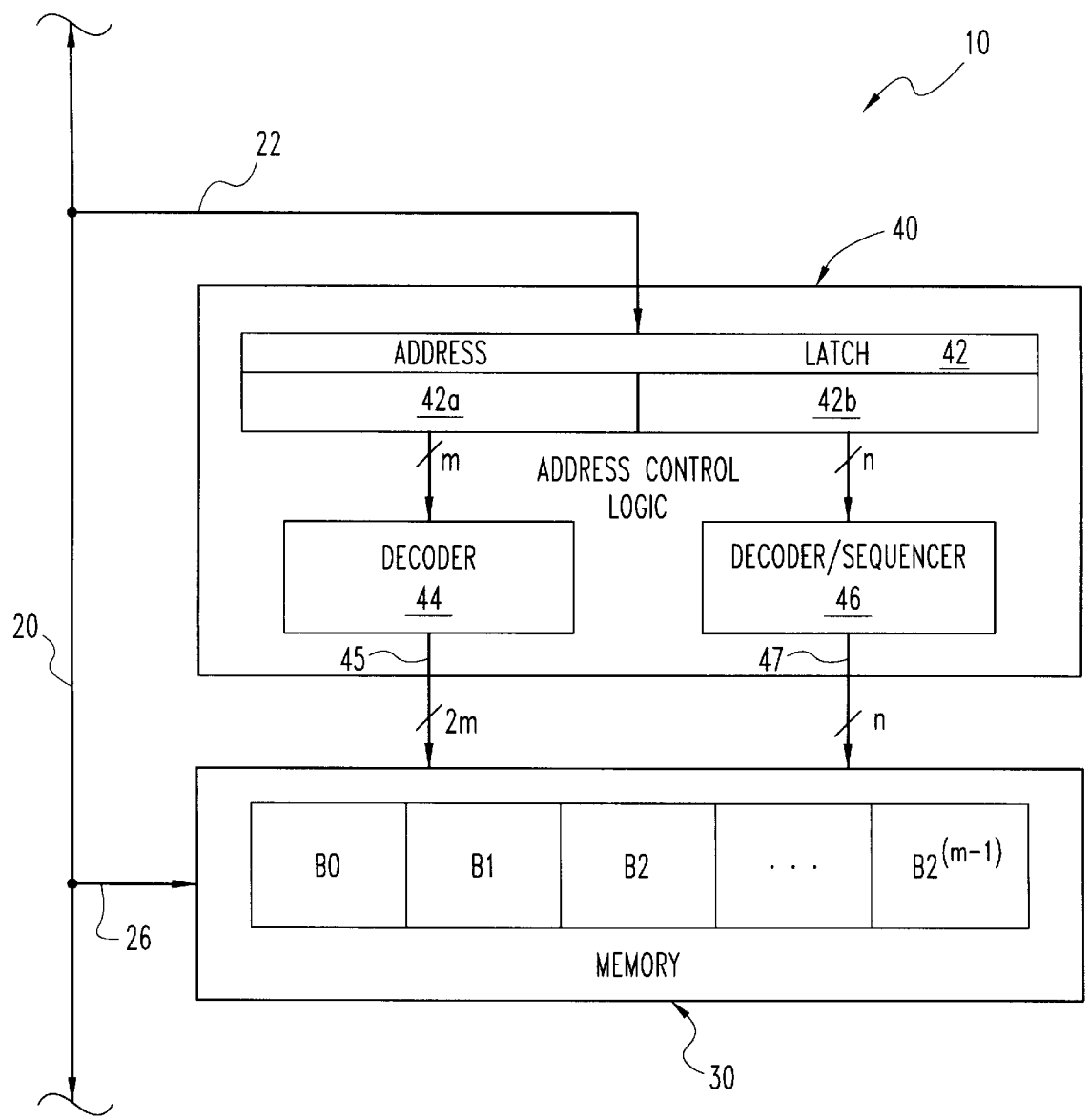
FIG. 1 is a schematic view of a processing system of a first embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described device, and any further applications of the principles of the invention as described herein are contemplated as would normally occur to one skilled in the art to which the invention relates.

FIG. 1 is a schematic representation of processor system 10 of one embodiment of the present invention. Processing system 10 includes bus 20, memory 30, and address control logic 40. Bus 20 has branch 22 operatively coupled to address control logic 40 and branch 26 operatively coupled to memory 30. Preferably bus 20 is a parallel digital bus of a conventional variety which is operatively coupled to one or more processors and peripheral devices (not shown).

Figure 2:
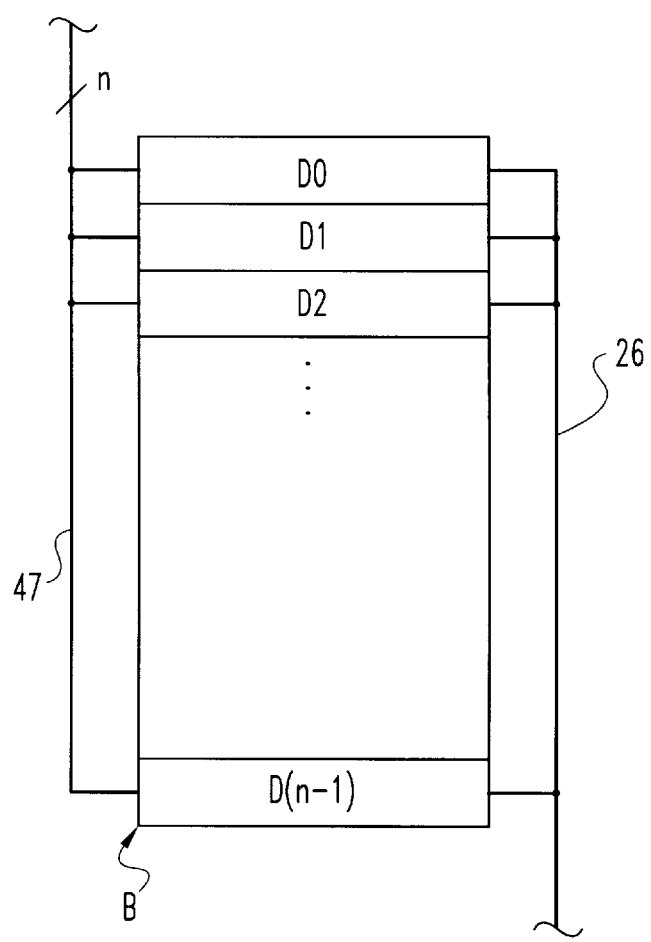
FIG. 2 is a schematic view of a representative block of memory of the embodiment of FIG. 1.

Memory 30 includes a number of memory blocks B0, B1, B2, . . . , and B2$^{(m-1)}$ where "2$^m$" is the total number of blocks (collectively designated blocks B). Referring additionally to FIG. 2, it is preferred that memory blocks B each include an equal number of contiguously addressable multi-bit memory locations D0, D1, D2, . . . , D(n−1) (collectively designated locations D), where "n" is the total number of independently accessible memory locations in a given block B.

Address control logic 40 includes address latch 42. Latch 42 is configured to load an address with segment 42$a$ of m bits and segment 42$b$ of n bits, where bits "m" and "n" are the same variables introduced in connection with memory blocks B and locations D. This address is loaded into latch 42 from bus 20 via branch 22. Logic 40 further includes a decoder 44 to decode the m address bits from segment 42$a$ to provide 2$^m$ select lines 45 to memory 30. Each select line 45 corresponds to a different block B. Logic 40 also includes decoder/sequencer 46 which provides n sequential selection lines 47 to memory 30. Each line 47 corresponds to a different location D within a given block B. Notably, the quantity of bits in segment 42$b$, the quantity of locations D, and the quantity of lines 47 are all equal to "n" in this preferred embodiment; however, in other embodiments, these quantities may differ as would occur to one skilled in the art.

In operation, system 10 is used to decode an address loaded into latch 42 from bus 20 to select a combination of locations D within a designated block B of memory 30 for access. The m number of bits in segment 42$a$ is decoded by decoder 44 to provide a signal via select lines 45 to designate one of the 2$^m$ blocks B for access. Preferably, decoder 44 is a conventional digital circuit with x digital inputs and 2$^x$ digital outputs. Each of the ouputs correspond to a different binary valve provided by the inputs such that a different output is activated in response to each different input valve.

In a one-to-one fashion, each of the n bits in segment 42$b$ corresponds to a different one of locations D in the designated block B. To designate one or more of locations D, a corresponding bit of the n bits is set to a designated value. Decoder/sequencer 46 compares each bit to determine whether the designated value has been set and provides a corresponding signal along sequential select lines 47 to permit access to each of the designated locations D within the designated block B. Access to each of locations D designated by the n bits is preferably provided in a predetermined sequence over branch 26 of bus 20. Thus, one process of transferring information with system 10 is: (a) providing an address via bus 20 to latch 42, (b) decoding the m bits of segment 42$a$ with decoder 44 to select a memory block B, and (c) successively accessing each of the locations designated by the n bits over bus 20 with decoder/sequencer 46. This access may include reading from or writing to the designated locations over bus 20 via branch 26 in a predetermined sequence. Preferably, decoder/sequencer 46 is configured by applying conventional sequential logic techniques so that access to each of locations D designated by bits n is sequentially provided from the least significant bit n to most significant bit n (right to left).

Figure 2A:
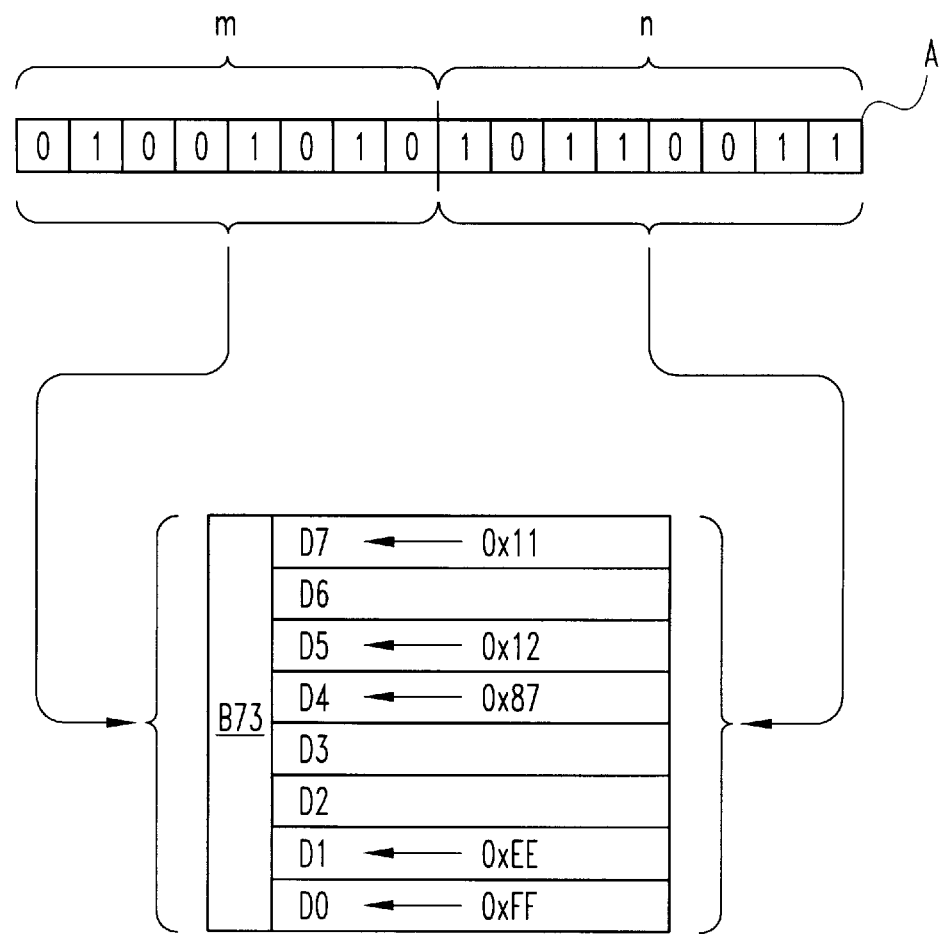
FIG. 2A is a diagram illustrating one example of the addressing scheme employed by the embodiment of FIG. 1.

By way of non-limiting example, the case where m=8 and n=8 is illustrated in FIG. 2A for an address A=0×4B3 (hexadecimal). For m=8, 2$^m$=2$^8$=256 blocks B are designated as blocks B0–B255. Each of the 256 blocks B has n=8 locations D designated as locations D0–D7. For address A, m=0×4A (hexadecimal) which corresponds to block B73. Decoder 44 activates a corresponding one of the select lines 45 to designate block B73. The bits n=0×B3 (hexadecimal) equal 1011 0011 in binary. Letting a binary value of 1 be the designated value for all bits n in this example, and going from the least significant bit to the most significant bit, the 5 ones in the binary designation 1011 0011 designate locations D0, D1, D4, D5, and D7 for access within block B73. For this example, the width of location D is one byte (8 bits) and the data 0×FF, 0×EE, 0×87, 0×12, 0×11 is being written to locations D0, D1, D4, D5 and D7, respectively. The other locations of block B73 are unchanged. The arrows in FIG. 2A schematically represent the relationship of the m and n bits of address A to the designated block B73 and designated locations D0, D1, D4, D5, and D7, respectively.

For processing equipment frequently requiring access to non-contiguous, closely grouped memory locations, the addressing scheme of system 10 can be employed to improve bus bandwidth by requiring only a single address for a multiple number of accesses to a common memory block. Notably, system 10 may be used to access any one or any combination of locations D within a designated block B. The combination may include any one or all of the locations, as well as any contiguous or non-contiguous group of locations therein. The number of unique combinations or groupings "NC" of two or more of "n" locations within a block is given by: NC=(2$^n$−(n+1)). It is envisioned that the addressing scheme of the present invention may be adapted to a number of different processing applications.

Although it is preferred that each designated location be accessed successively, in other embodiments the system may be adapted to access two or more locations designated by bits n in parallel. Also, even though a parallel bus with separate parallel address and data lines is preferred, the bus may be serial, a serial/parallel combination, a multiplexed configuration, or another arrangement that would occur to those skilled in the art.

Furthermore, the width in bits of data stored in a given location D may vary, but preferably is at least one nibble for each location. As used herein, a "nibble" is 4 bits, a "byte" is 8 bits, a "word" is 16 bits, and a "double word" or "dword" is 32 bits. Similarly, the width in bits of the address loaded in latch 42 may differ for various embodiments. In one preferred embodiment m and n are greater than or equal to 4. In a more preferred embodiment, both m and n are greater than or equal to 8. In a most preferred embodiment m is greater than 8 and n is greater than or equal to 16.

System 10 may be implemented on a single integrated circuit chip or with a combination of components using synchronous or asynchronous techniques. Furthermore, various aspects of the system may be implemented in software or firmware as would occur to one skilled in the art. Bus 20 may include dedicated control channels or lines including, but not limited to, a clock and various select or enable signals. Nonetheless, in other embodiments dedicated control channels or lines may not be necessary. Preferably, memory 30 is of the electronic (e.g. solid state), magnetic, or optical variety. Also, memory 30 may be embedded in a dedicated processing circuit, or constituted as one or more separate devices.

Figure 3:
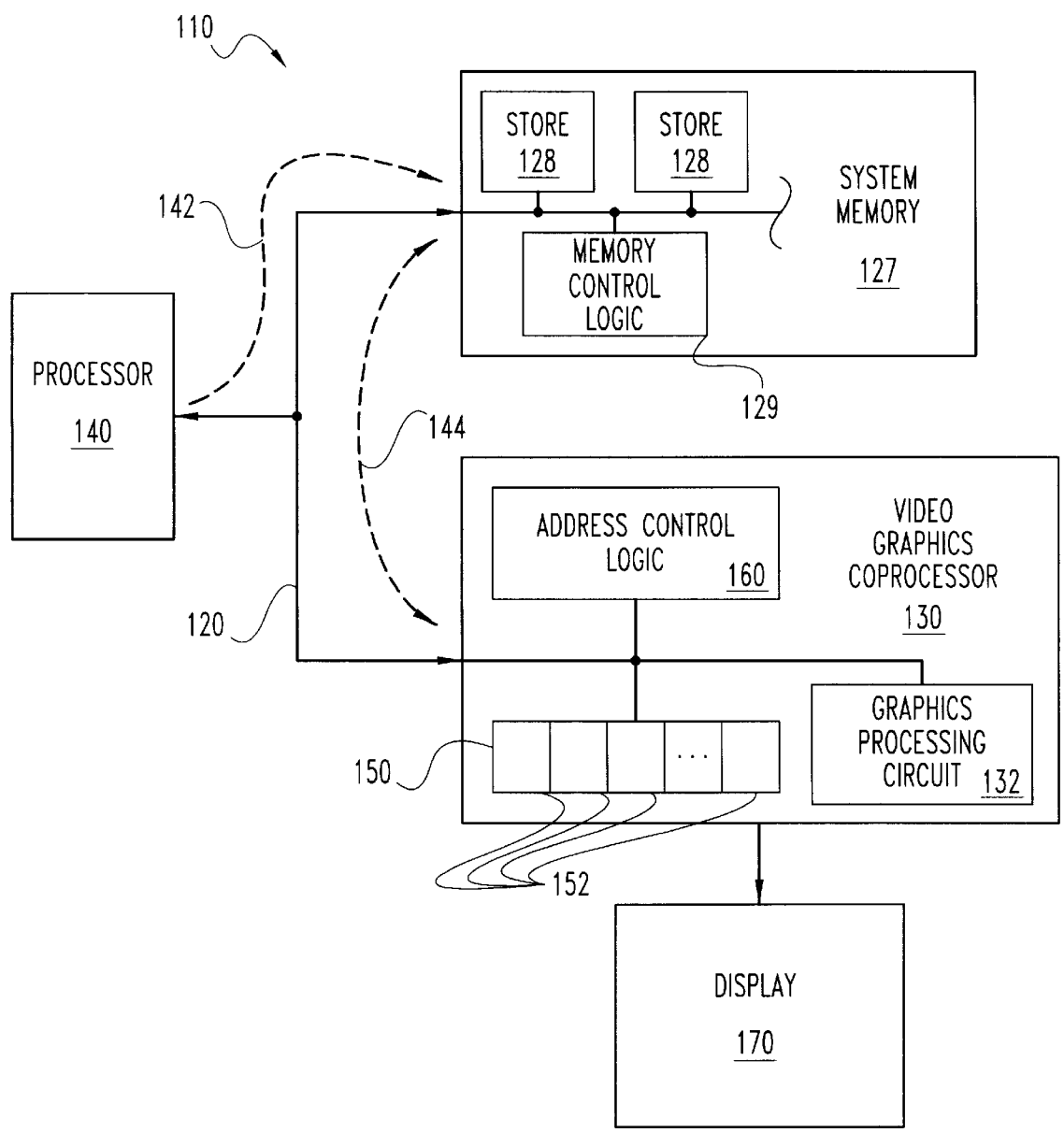
FIG. 3 is a schematic view of a processing system of a second embodiment of the present invention.

FIG. 3 schematically depicts processing system 110 of a second embodiment of the present invention. System 110 includes a bus 120 linking system memory 127, graphics coprocessor 130, and processor 140. Preferably, bus 120 includes separate parallel data lines, address lines, and control lines, but may vary as discussed in connection with system 10. System memory 127 includes memory stores 128 operatively coupled to memory control logic 129. The architecture of stores 128 and memory control logic 129 of system memory 127 may be of a conventional variety common to various microcomputers. Similarly, it is preferred that processor 140 be a conventional microprocessor configuration adapted to execute software residing in system memory 127. System memory 127, processor 140, or both may include an associative cache memory (not shown). Also, processor 140 may be an electronic circuit comprised of one or more components, and may include digital circuitry, analog circuitry or both. Furthermore, in other embodiments processor 140 may be an integrated state machine, a hybrid combination of state machine and programmable logic, or such other configuration as would occur to one skilled in the art.

Video graphics coprocessor 130 has graphics processing circuit 132 to manage digital graphics data. Coprocessor 130 also includes a memory portion 150 with 16,384 ($2^{14}$) consecutively addressable double word registers 152 and an address control logic portion 160. Coprocessor 130 is operatively coupled to display 170. Display 170 is a digitally controlled cathode ray tube display with graphics capability, and is the type common to conventional computer systems. Typically, processor 140 writes data to register 152 to control the output on display 170 via processing circuit 132.

Preferably, address control logic portion 160 and memory 150 are adapted to employ the addressing scheme disclosed in connection with FIGS. 1 and 2. Given the closely grouped, but frequently non-contiguous nature of graphics data, this approach generally optimizes the bandwidth of graphic data transfers over bus 120 with memory 150 of coprocessor 130.

It is preferred that memory 150 includes 64K bytes of memory space (a total of 65,536 bytes, where K=1024 base ten). Furthermore, for this 64K byte space, it is preferred that registers 152 be grouped into $2^{10}$=1024 register groups each having 16 double word locations. The values loaded into memory 150 by processor 140 are usually determined by a software video graphics routine or "driver" executed by processor 140.

Figure 4:
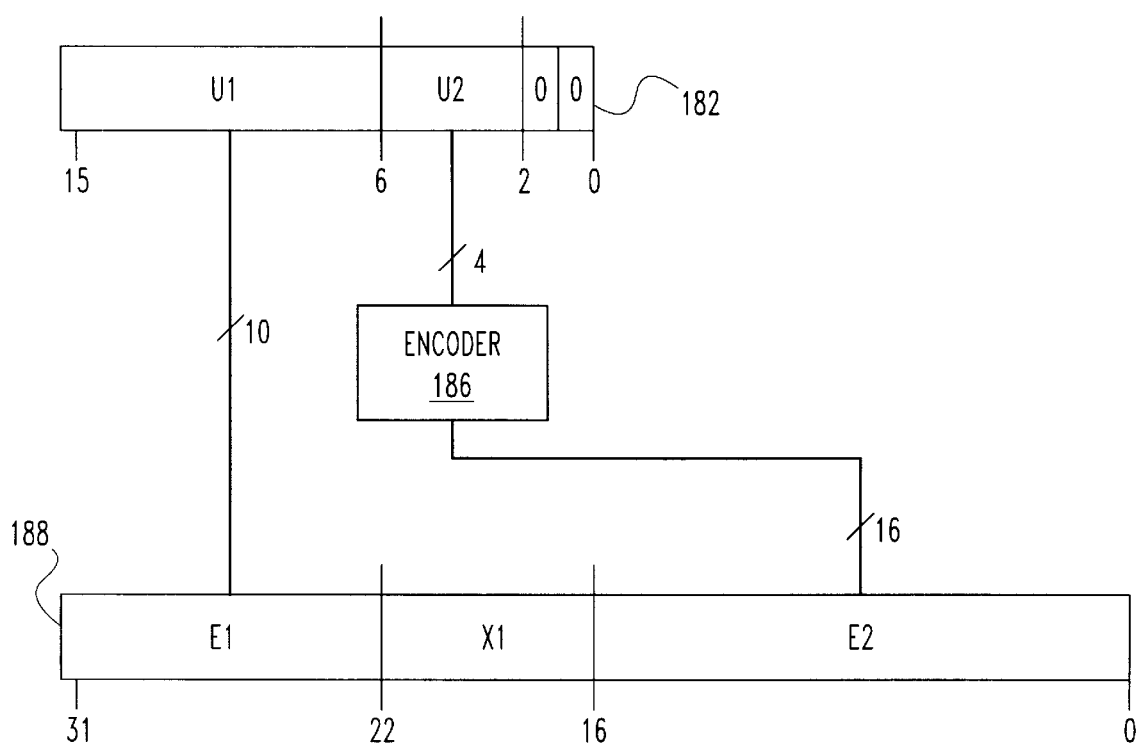
FIG. 4 is a diagrammatic representation of an address encoding format for the embodiment of FIG. 3.

Referring to FIG. 4, a preferred encoding scheme is illustrated for system 110. An address 182 is illustrated having a width of 16 bits corresponding to the number of bytes (64K) in memory 150. In terms of the format of address 182, each one of the 1024 groups of registers corresponds to a different 64 byte address range of 16 double word registers. For example, address range 0x0000 to 0x003F has the 16 double word registers addressed at 0x0000, 0x0004, 0x0008, 0x000C, 0x0010, 0x0014, 0x0018, 0x001C, 0x0020, 0x0024, 0x0028, 0x002C, 0x0030, 0x0034, 0x0038, 0x003C. Similarly, the address range 0x0040 to 0x007F has the 16 double word registers at addresses 0x0040, 0x0044, 0x0048, 0x004C, 0x0050, 0x0054, 0x0058, 0x005C, 0x0060, 0x0064, 0x0068, 0x006C, 0x0070, 0x0074, 0x0078, 0x007C, and so on until the final address range 0xFFC0 to 0xFFFF which has the 16 double word registers at addresses 0xFFC0, 0xFFC4, 0xFFC8, 0xFFCC, 0xFFD0, 0xFFD4, 0xFFD8, 0xFFDC, 0xFFE0, 0xFFE4, 0xFFE8, 0xFFEC, 0xFFF0, 0xFFF4, 0xFFF8, 0xFFFC.

Address 182 includes segment U1 having 10 bits and segment U2 having 4 bits. The two least significant bits are set to zero to provide a 2 byte address boundry. Segment U1 translates directly to group pointer segment E1 of encoded address 188 to uniquely designate one of the 1024 groups of registers. The bits corresponding to segment U2 are input to encoder 186 to output 16 bits in segment E2 of encoded address 188. The bits of segment E2 are collected for a number of different addresses within the same group designated by segment E1 to encode address 188 with multiple locations or registers. Specifically, encoder 186 maps each different binary value of the four bits of segment U2 to a different one of the 16 bits in segment E2. Segment X1 is between segments E1 and E2 and corresponds to bits 16 through 21 of encoded address 188. The bits of X1 are used to provide a four byte address boundry for this embodiment and are preferably set to X1=00 0000 binary. In other embodiments, even byte boundries may not be needed so that segment X1 of encoded address 188 and the two least significant bits of address 182 are not needed. In still other embodiments, the quantity of the segments U1, U2, E1, and E2 may differ, and the ordering and arrangement of segments U1, U2, E1, and E2 may vary as would occur to one skilled in the art. Also, although it is preferred that the translation of segments U1, U2 into segments E1, X1, E2, (including the function of encoder 186), be performed by software executed by processor 140, alternatively the translation may be partially or completely performed by a dedicated circuit.

By way of non-limiting example, consider the following five register addresses in the 0x2300–0x233F range: 0x2300, 0x2308, 0x231C, 0x2330, 0x233C. For this example, U1=E1=0010 0011 00 (binary). After stripping the 2 least significant bits of address 182, (which are set to 00), the U2 segments for these addresses are 0x0, 0x2, 0x7, 0xC, 0xF, respectively; and the resulting segment E2=1001 0000 1000 0101 binary. Because X1=00 0000 (binary), the resulting encoded address 188 (E1, X1, E2) is 0x23009085 (hexadecimal).

In operation, this address is sent by processor 140 along path 142 to system memory 127. Following the transmission of the address, 5 double word data strings are also sent to system memory 127 each corresponding to one of the addresses encoded in segment E2. Once processor 140 relinquishes control of bus 120, a Direct Memory Access (DMA) management process is activated by memory control logic 129. Through this process, coprocessor 130 obtains control of bus 120 to load the address and corresponding double word data strings via path 144 through DMA. Coprocessor 130 decodes the encoded address in format 188 with logic 160 to access the selected registers 152 in accordance with the scheme presented for the embodiment of FIGS. 1, 2 and 2A, where segment E1 generally corresponds to the m bits and segment E2 generally corresponds to the n bits. Address control logic 160 decodes segment E1 to designate one of the 1024 groupings of registers 152 of memory 150. The 16 bits of segment E2 are then employed to successively access each of the five registers designated within the selected register group for the given example. Like the embodiment of FIGS. 1 and 2, this embodiment permits the designation of any one register or all possible combinations of the registers within a given group. Furthermore, the DMA processing of information for coprocessor 130 further enhances the flexibility of system 110 in addition to the bandwidth savings recognized by encoding multiple non-contiguous locations in a single compact address format.

As another non-limiting example, consider two register addresses 0×A298 and 0×A29C in the 16 register (64 byte) address range 0×A280 to 0×A2BF. For this example, U1=E1=1010 0010 10, and the U2 segments are 0×6 and 0×7, respectively (after stripping the two least significant bits of address 182). As a result, E2 =000 000 1100 0000 binary which provides an encoded address 188 of 0×A2800C0 (hexadecimal). As in the prior example, it is preferred that this encoded address and corresponding two double words of data be stored in memory system 127 for later DMA access. Nevertheless, in other embodiments processor 140 may read data from coprocessor 130 or write data into coprocessor 130 by directly accessing memory 150 over bus 120 instead of employing a DMA process.

Referring generally to system 10 and 110; the present invention facilitates addressing of one or more locations within a designated memory block or group. An address is employed that includes at least two groups of bits: (a) a first group to designate a block of memory and (b) a second group to specify the locations within the block to be accessed. Although it is preferred that the bits of each group be contiguously formatted, in other embodiments it is envisioned that the bits may be interleaved, re-ordered, or otherwise re-arranged as would occur to one skilled in the art. Furthermore, the various components of systems 10 and 110 may be interchanged, substituted, duplicated, or deleted, and other components added, as would occur to one skilled in the art without departing from the spirit of present invention.

All publications, patents, and patent applications cited in this specification are herein incorporated by reference as if each individual publication, patent, or patent application were specifically and individually indicated to be incorporated by reference and set forth in its entirety herein.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A method of transferring digital information, comprising:

(a) generating an address having a first number of bits and a second number of bits;

(b) transmitting the address to a digital device with a memory, the memory including a number of independently accessible multi-bit storage registers;

(c) decoding the first number of bits to select a contiguously addressable group of at least 4 of the registers;

(d) selecting a non-contiguous combination of the registers in the group as a function of the second number of bits, the second number of bits being configured to provide a different bit pattern for each different non-contiguous set of the registers in the group, the patterns each being selectable to provide a correspondingly different set for the combination; and (e) writing multi-bit data to each of the registers of the combination.

2. The method of claim 1, wherein each of the second number of bits corresponds to a different one of the number of registers, and inclusion of each one of the registers in the combination is determined by setting a corresponding bit of the second number of bits to a designated value.

3. The method of claim 1, wherein:

said decoding includes generating a first signal with the digital device corresponding to the group of registers;

said selecting includes generating a plurality of second signals within the digital device, each of the second signals corresponds to a different one of the registers in the non-contiguous combination; and said writing includes consecutively storing data in each one of the registers in the non-contiguous combination.

4. The method of claim 1, wherein:

the address is generated by a software program executed by a digital processor;

the digital device includes a video graphics processing circuit coupled to the processor by a bus;

the first number of bits is at least 8;

the second number of bits is at least 8; and the registers are each at least 32 bits wide and equal in quantity to the second number of bits, each of the second number of bits corresponds to a different one of the number of registers, and inclusion of each one of the registers in the combination is determined by setting a corresponding bit of the second number of bits to a designated value.

5. The method of claim 1, wherein:

said generating includes providing the address with a processor coupled to the digital device by a bus;

said transmitting includes storing the address in a system memory coupled to the bus and executing a DMA process to access the address with the digital device; and said writing includes storing a number of multi-bit data strings provided by the processor in the system memory and executing the DMA process to access the data strings with the digital device.

6. The method of claim 1, wherein the address is generated by a software program executed by a digital processor and the digital device includes a video graphics processing circuit coupled to the processor by a bus.

7. The method of claim 6, wherein said writing includes sequentially sending data to each of the registers from the processor after said transmitting.

8. The method of claim 6, further comprising changing a video display coupled to the digital device in response to said writing.

9. A digital processing system, comprising:
(a) a processor configured to generate an address signal having a first number of bits and a second number of bits;
(b) a digital bus operatively coupled to the processor to transmit the address signal; and
(c) a digital device operatively coupled to the bus to receive the address signal, the device having a memory with a plurality of memory blocks, the device being configured to generate:
(i) a block signal from the first number of bits, the block signal corresponding to a block selected from the memory blocks, the block having a number of contiguously accessible multi-bit storage locations, the number of locations being greater than 4, and
(ii) a plurality of location signals from the second number of bits corresponding to a non-contiguous set of the locations, the second number of bits being configured to provide a different bit pattern for each different non-contiguous grouping of the locations, the patterns each being selectable to provide a correspondingly different non-contiguous grouping for the set; and
wherein the device provides access to each of the locations in the set in accordance with the block signal and the location signals.

10. The system of claim 9, wherein the digital device includes a video graphics coprocessor and further comprising a digital display operatively coupled to the digital device, the display being responsive to data stored in the locations in the set.

11. The system of claim 9, wherein each of the second number of bits corresponds to a different one of the number of locations, and inclusion of each one of the locations in the combination is determined by setting a corresponding bit of the second number of bits to a designated value.

12. The system of claim 9, wherein the digital device includes a video graphics processing portion and an address control logic portion, the address control logic portion being configured to generate the block signal from the first number of bits and the location signals from the second number of bits.

13. The system of claim 9, further comprising:
a system memory coupled to the bus;
a control circuit operatively coupled to the bus to control direct memory access to the system memory by the digital device; and
wherein the processor is configured to store the address signal in the system memory, and the digital device is configured to receive the address signal from the system memory by direct memory access with the control circuit.

14. The method of claim 9, wherein:
the address signal is generated by a software program executed by the processor;
the digital device includes a video graphics processing circuit;
the first number of bits is at least 8;
the second number of bits is at least 8; and
the locations are each at least 16 bits wide and equal in quantity to the second number of bits, each of the second number of bits corresponds to a different one of the locations, and inclusion of each one of the locations in the combination is determined by setting a corresponding bit of the second number of bits to a designated value.

15. A method of transferring digital information, comprising:
(a) providing a digital device with a memory, the memory being separable into a number of memory blocks;
(b) establishing a first number of bits to address a block selected from the memory blocks, the block having n number of independently addressable multi-bit storage locations, n being greater than 4;
(c) establishing a second number of bits to address a non-contiguous set of the n locations, the second number of bits being configured to select the set from a number of different non-contiguous combinations of the n locations, the number of combinations being greater than n; and
(d) providing the first and second number of bits to the device to transmit a number of different multi-bit strings each corresponding to one of the n locations in the set.

16. The method of claim 15, wherein the address is generated by a video software program executed by a digital processor and the digital device includes a video graphics processing circuit coupled to the processor by a bus.

17. The method of claim 15, wherein the second number of bits are further configured to select any one of $(2^n-(n+1))$ unique groupings of the locations.

18. The method of claim 17, wherein the locations are in one-to-one correspondence with the second number of bits, and inclusion of each one of the locations in the set is determined by setting a corresponding bit of the second number of bits to a designated value.

19. The method of claim 18, wherein the second number of bits is equal to n.

* * * * *

UNITED STATES PATENT AND TRADEMARK OFFICE
CERTIFICATE OF CORRECTION

PATENT NO. : 5,774,135
DATED : June 30, 1998
INVENTOR(S) : Lawrence Letham

It is certified that error appears in the above-identified patent and that said Letters Patent is hereby corrected as shown below:

In claim 14, line 1, delete the word "method" and insert the word --system--.

Signed and Sealed this

Twenty-third Day of March, 1999

Attest:

Q. TODD DICKINSON

Attesting Officer    Acting Commissioner of Patents and Trademarks